Sept. 28, 1937.  C. C. WILLIS  2,094,111
DRIER
Original Filed May 17, 1934   3 Sheets-Sheet 1
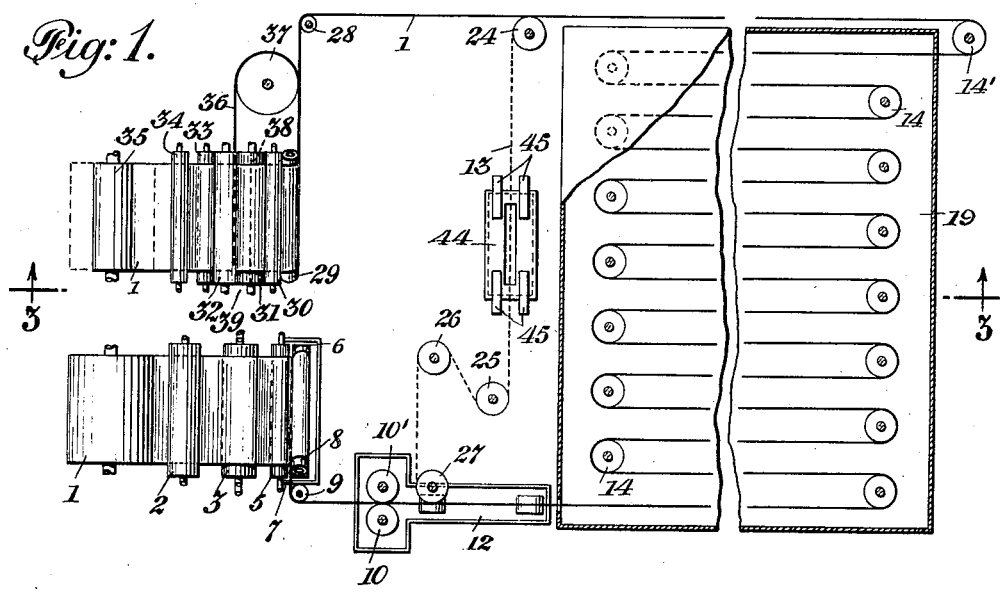
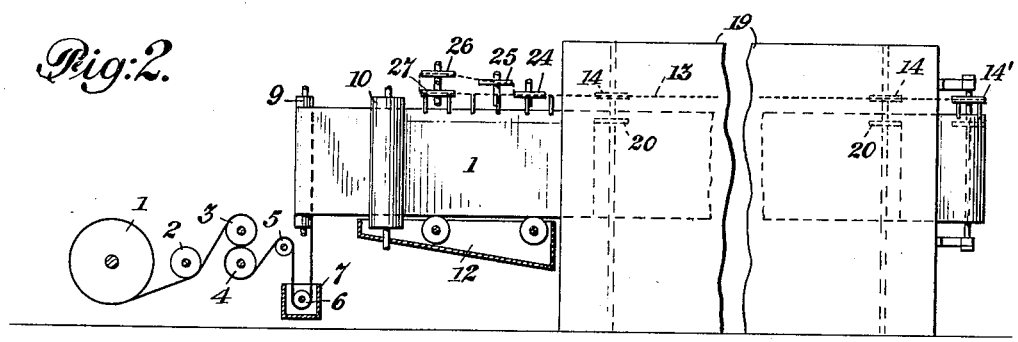
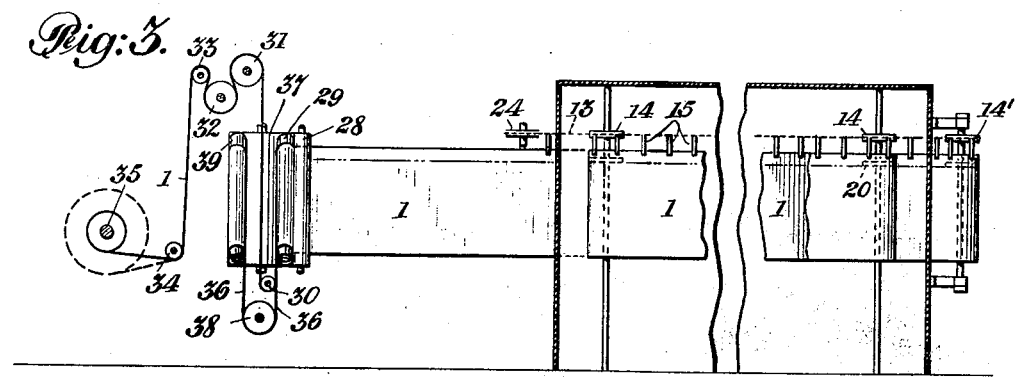
INVENTOR
Charles C. Willis
BY C. Campbell Hunich
ATTORNEY Sept. 28, 1937.   C. C. WILLIS   2,094,111
DRIER
Original Filed May 17, 1934   3 Sheets-Sheet 2
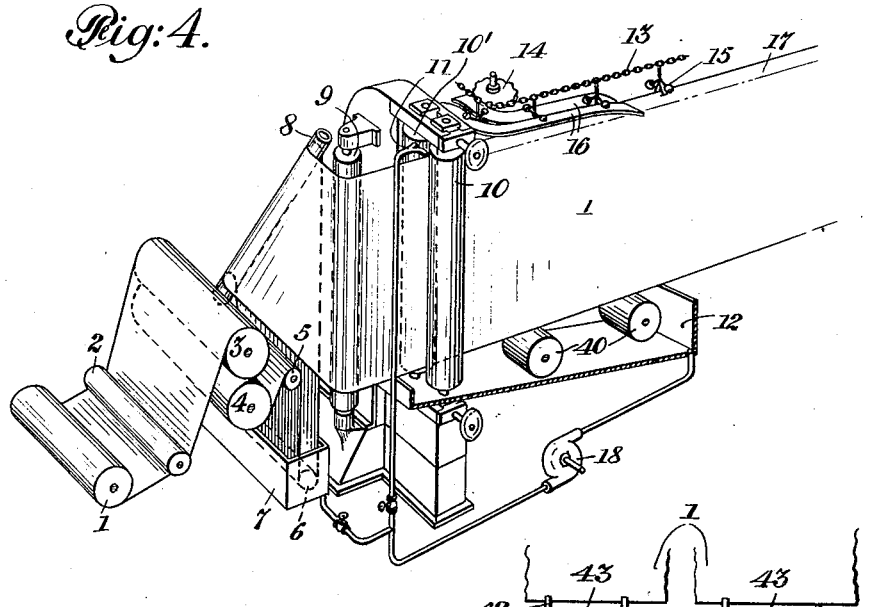
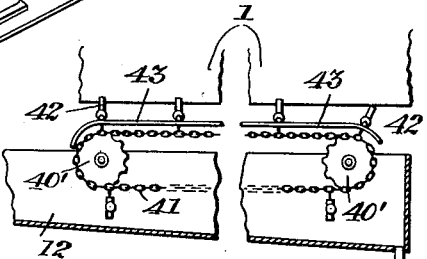
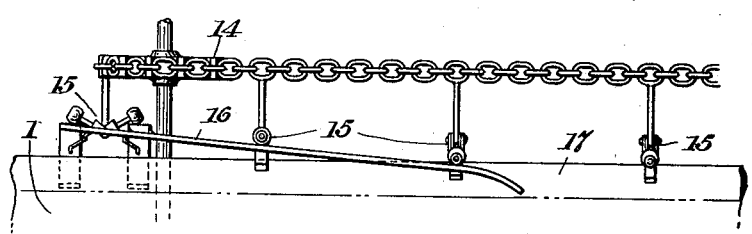
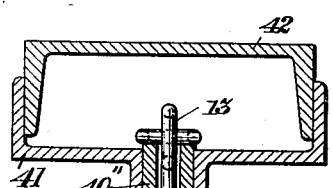
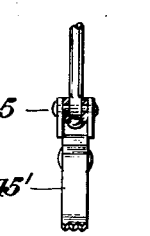
INVENTOR
Charles C. Willis
BY C. Campbell Hunick
ATTORNEY Sept. 28, 1937.  C. C. WILLIS  2,094,111
DRIER
Original Filed May 17, 1934   3 Sheets-Sheet 3
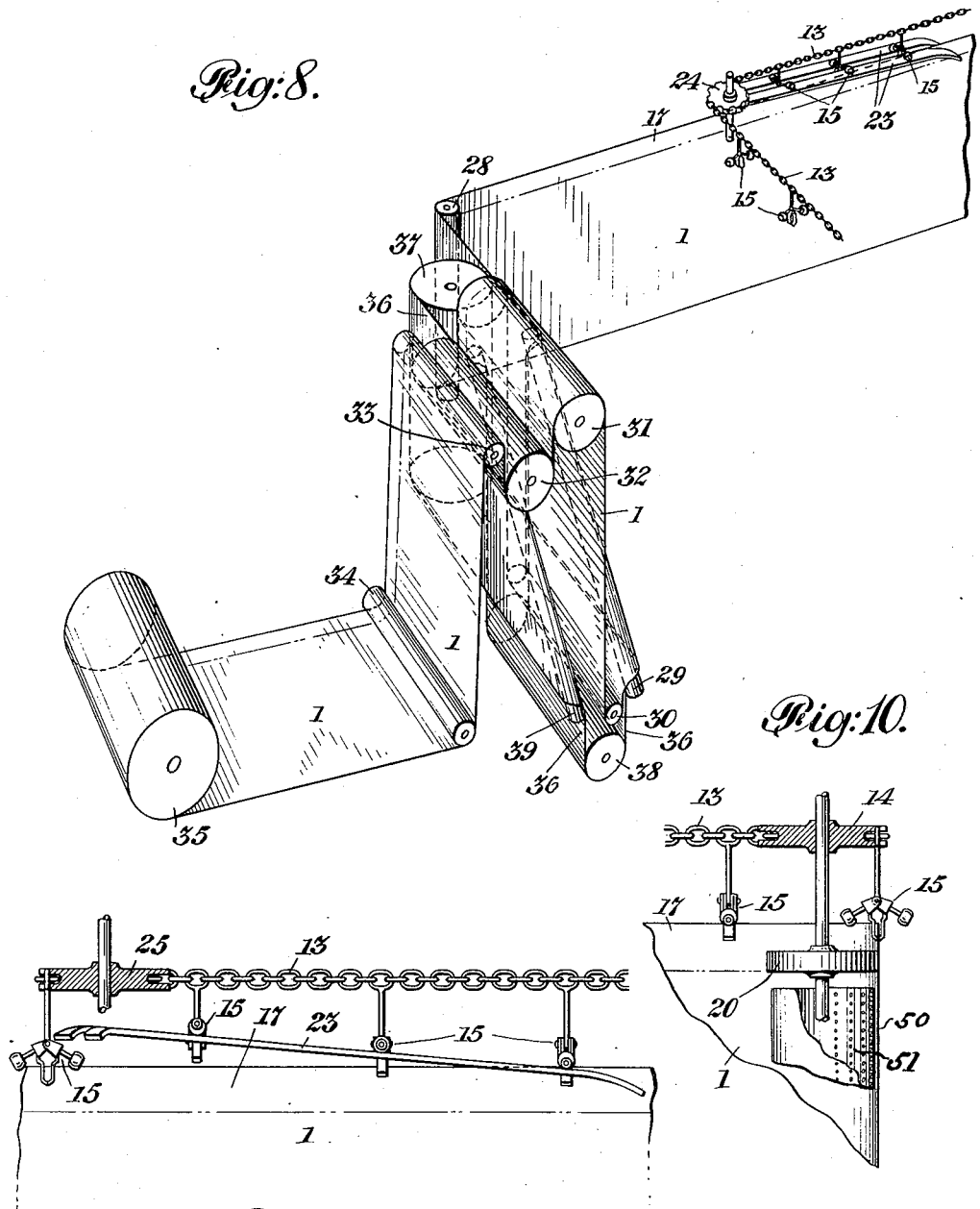

Patented Sept. 28, 1937

2,094,111

UNITED STATES PATENT OFFICE 2,094,111

DRIER

Charles C. Willis, Bound Brook, N. J., assignor to John Waldron Corporation, New Brunswick, N. J., a corporation of New Jersey Application May 17, 1934, Serial No. 726,034
Renewed March 4, 1937

4 Claims. (Cl. 91—55)

This invention relates to driers for coated paper, textiles and other material in the web.

The usual type of device for drying coated paper is a chamber through which the paper is moved either by carrying same in festoons on sticks or by floating same on air through the drier or a tower.

Many forms of coatings such as varnishes, due to the tacky condition when partially dried and the length of time required for oxidizing can only be run at very slow speeds. If run with coating on both sides the material will adhere to the sticks or leave stick mark settings on the paper. Therefore, only one side of the paper is generally coated and dried and then the operation is repeated to coat both sides increasing the time required. It is also necessary to maintain very slow speeds. In some of such machines the speed cannot exceed three feet per minute. Even where only one side is coated and dried at one time the stick mark settings are sometimes discernible.

One of the objects of this invention is to provide a drier for coated paper and the like wherein a large capacity of paper is dried in a small space.

Still another object of the invention is to provide a device for drying paper and the like wherein the speed of the travelling web may be increased to any desired limit yet provide ample time for proper drying or oxidation within the space provided.

A still further object of the invention is to provide a drier wherein paper or the like may be coated on both sides at once and dried on edge regardless of the width of the paper without marking the paper.

Referring to the drawings:

Figure 1 is a plan view of a device embodying the principles of this invention.

Figure 2 is a side view of Figure 1.

Figure 3 is a cross sectional view of Figure 1 along the line 3, 3, looking in the direction of the arrows.

Figure 4 is a detail view of the coating end of the drier.

Figure 5 is a detail view of the carrying chain and clamps showing the guide track for opening the clamps as they pass over the selvage to permit the automatic securing of the selvage by the clamps to support the web in passage through the machine.

Figure 6 is a detail sectional view of the clamps.

Figure 7 is a detail view of Figure 6 along the line 7, 7, looking in the direction of the arrows.

Figure 8 is a detail view of the windup from the drier.

Figure 9 is a detail view of the clamp removal means.

Figure 10 is a detail view of the direction reversing pulleys within the drying chamber.

Figure 11 is a detail view of auxiliary web pulling stabilizing device for the bottom edge of the web whereby a uniform withdrawing of the web through the coating rollers may be had in certain cases where the adhesion of the particular coating is too great for the use alone of the overhead carrying chain and clamps.

In carrying out this invention, paper 1 starting from the unroll position passes under roll 2 and around pull rolls 3, 4, over roll 5 and around dip roll 6 which may be submerged in a bath 7, thence around angle bar 8 where the paper is changed from horizontal to vertical position to pass around roll 9 and thence between feed rolls 10, 10'. At the feed rolls 10, 10', the paper 1 is coated. The coating of either or both sides of the web 1 may be done in any well known manner. I have shown a preferred form for coating wherein the web 1 is coated while on edge and wherein the coating is applied by a stream of coating issuing from pipes 11 pumped from reservoir 12 by pump 18. The openings of pipes 11 being on each side of web 1 coat both sides of the paper. Rolls 10, 10', running as squeeze rolls are set slightly wider than the paper to carry the coating into the nip and coat both sides of the paper uniformly. Rolls 10, 10', may be run as shown in the drawings or may be run as reverse turning rolls with cleaning doctors, in case the rolls are run as reverse turning rolls, the coating material is applied directly to the web. Excess coating will be supplied adjacent the top of rolls 10, 10', which excess runs down the rolls draining into tank 12 where it is again repumped to the top of rolls 10, 10'. Rolls 10, 10', are rotated at a slightly faster speed than the pull rolls 3, 4, to maintain a tension on web 1 between pull rolls 3, 4, and rolls 10, 10'. As the paper leaves rolls 10, 10', it passes underneath chain 13 which is carried by sprockets 14. Chain 13 has positioned clamps 15 at suitable distances, usually about twelve to eighteen inches. Adjacent the rolls 10, 10', is a track 16 which opens clamps 15 raising the jaws 15' over the paper to permit jaws 15' to again contract to grip the selvage 17 of the web 1. In some cases it is necessary for an auxiliary pulling effect at the bottom of the web for a short distance in order to have a uniform pull on the web. This may be required with heavy or tacky varnishes or other coating materials. In Figure 11 within tank 12, I provide sprockets 40' in place of rollers 40. These sprockets carry chain 41 carrying clamps 42 which may be similar to clamps 15. Parallel tracks 43 are provided to permit engagement and disengagement of the clamps 42 with the web. The selvage 17 or uncoated edge of the paper is determined by the height of the coating spray pipes 11 with respect to the top edge of rolls 10, 10', or by the distance away from said rolls and the pressure of the spray. The clamps 15 are secured to the travelling chain 13 as shown in Figure 6. The web 1 borne by clamps 15 carried by chain 13 passes into the drying chamber 19 and thence around a plurality of sprockets 14. Sprockets 19 carry disks 20 which are supported below sprockets 14 and below clamps 15 and are adapted to bear against the selvage 17 so that the paper may be controlled at all times as it is carried around the curves in a continuous curve even when unsupported by the clamps 15. With certain types of material, I have found it desirable to use a blast of air below disks 20 as shown in Figure 10 impinging on the inflow of the web as it passes around the turn. The pressure air is fed to the rotating cylinder 50, having perforations 51. This air holds the web in a circular form while making the turns. The sprockets 14 at either end of the chamber may be driven sprockets while the sprockets at the other end may be idler sprockets if desired to allow spring takeups (not shown) if desired to allow for the expansion or contraction of the chain in the drier.

The chain 13 is supported in chamber 19 by channel tracks 40'', the latter being supported by Z bars 41 which are hung from the roof channel beams 42 of chamber 19. Variations in the suporting track and structure may be made as required.

Leaving the drying chamber 19 the web will pass around the last sprocket 14 and thence around sprocket 14' and thence the chain will pass around sprockets 24, 25, 26, and 27, to the initial position exteriorly of the drier. The web 1 passes under track 23 adjacent sprocket 24 where the clamps 15 are again spread so that jaws 15' will clear the paper as they are raised by track 23 and carried around sprocket 24. In cases where the web is impregnated prior to coating or there is no uncoated selvage it is necessary for the clamp jaws 15' to be cleaned and I provide in the path of travel from roll 24 a bath of solvent in container 44 with an arrangement of entrance and exit parallel tracks 45 which raise the jaws 15' of the clamps over the edge of container 44 to permit the jaws 15' to dip in the bath. The jaws 15' of the clamps 15 may be flooded if desired by nozzles within the tank. These nozzles are of any well known make and have therefore not been shown in the drawings. The paper then passes around roll 28. From roll 28 the paper passes around angle bar 29, thence downwardly around roll 30, upwardly and around rolls 31, 32, 33, 34, to the rewind roll 35. To prevent scratching of the coated surfaces web 1 is protected by belt 36 which rotates around roll 37, thence around angle bar 29 between web 1 and said angle bar 29, then leaving web 1 said belt 36 passes around roll 38 over angle bar 39, thence back around roll 37. Belt 36 therefore is a continuous belt rotating as described between the surface of the paper and angle bar 29. The belt 36 need only be used in the cases where the surface will be scratched by the angle bar.

Various modifications may be made and still fall within the scope of this invention, for instance, any form of coater may be used provided an uncoated edge is left on the web and the clamps may be varied in structure as well as the type of supporting chain.

It will thus be seen that I have invented a drier which will permit varying widths of web to be dried therein at relatively high speeds and in a compact and small area and wherein both sides of the material may be coated without marring or damaging the coated surface and wherein almost any type of coated material may be dried regardless of the material used in coating without the necessity of manually handling the paper after the initial starting.

Although this invention is particularly designed to be used in connection with slow drying coatings such as oxidizing oils it is adapted for use in connection with the drying of any web of material and the drying chamber may be supplied with a heating medium of a reducing or oxidizing atmosphere.

What I claim is:

1. In a combined coating and drying apparatus for a web of material, means for coating the material on two sides leaving an uncoated margin on the web, means for transporting said coated web by said margin through a drying chamber, a drying chamber having a number of passes, means for changing said web from a vertical plane to a horizontal plane preliminary to winding same exteriorly of the drier in a horizontal plane, and a continuous belt interposed between the means for changing the direction of the paper to prevent marring of the surface of the coating.

2. In combination with a coating apparatus of a drier for drying a web of material and the like on edge, means for changing the plane of the web of material from the vertical to the horizontal preliminary to rewinding the roll of paper in the horizontal plane, said directional changing means comprising an angle bar and a horizontal roll and a continuous belt passing between the surface of the material and the angle bar whereby the coated web is carried around the angle bar to prevent marring of the surface and the continuous belt then leaving the web and is returned by passing around another angle bar to its driving roll.

3. In a drier for drying paper and the like, a drying chamber, a plurality of driving and driven sprockets within said chamber, a disk rotatable with said sprockets and below same on uncoated edge of web, a travelling carrier chain, clamps in spaced relationship carried by said chain, a track for spreading said clamps to permit the jaws to pass over the edge of a travelling web of material, said track then terminating to permit said jaws to clamp to said web, said web having an uncoated margin for said clamps and for said disks whereby said web may be carried around said sprockets without kinking of the web, and a second track above said web at the exit opening from said drying chamber to automatically unhook said jaws of said clamps and lift them from the paper.

4. In a drier for drying a web of material, a drying chamber, a carrier, means for supporting and motivating the carrier through said chamber, means for securing and supporting a web of material from an uncoated margin in the vertical plane from said carrier, means for automatically securing and automatically releasing the web from said carrier as the material enters and leaves the drying chamber, means for changing the plane of the material to the horizontal and rewinding same after release from the carrier, and means for protecting the coated surface during the change in the plane.

CHARLES C. WILLIS.